W. J. McCOY.
TRUCK.
APPLICATION FILED OCT. 14, 1910.

1,000,102. Patented Aug. 8, 1911.

Witnesses
F. W. Ruess
Perry H. Pattison

Inventor
Walter J. McCoy
by R. H. Ruess, Attorney

UNITED STATES PATENT OFFICE.

WALTER J. McCOY, OF SOUTH OMAHA, NEBRASKA, ASSIGNOR OF ONE-HALF TO JOSEPH H. KOPIETZ, OF SOUTH OMAHA, NEBRASKA.

TRUCK.

1,000,102. Specification of Letters Patent. Patented Aug. 8, 1911.

Application filed October 14, 1910. Serial No. 587,054.

*To all whom it may concern:*

Be it known that I, WALTER J. MCCOY, a citizen of the United States, residing at South Omaha, in the county of Douglas and State of Nebraska, have invented new and useful Improvements in Trucks, of which the following is a specification.

The present invention has reference to improvements in trucks, and more especially in trucks of the type shown in my co-pending application, filed September 3, 1910, Serial No. 580,362.

It comprehends, briefly, a tiltable truck designed primarily for handling barrels, and possessing certain improvements in the mountings for the clamping arms, and in the devices for operating these arms.

Figure 1:
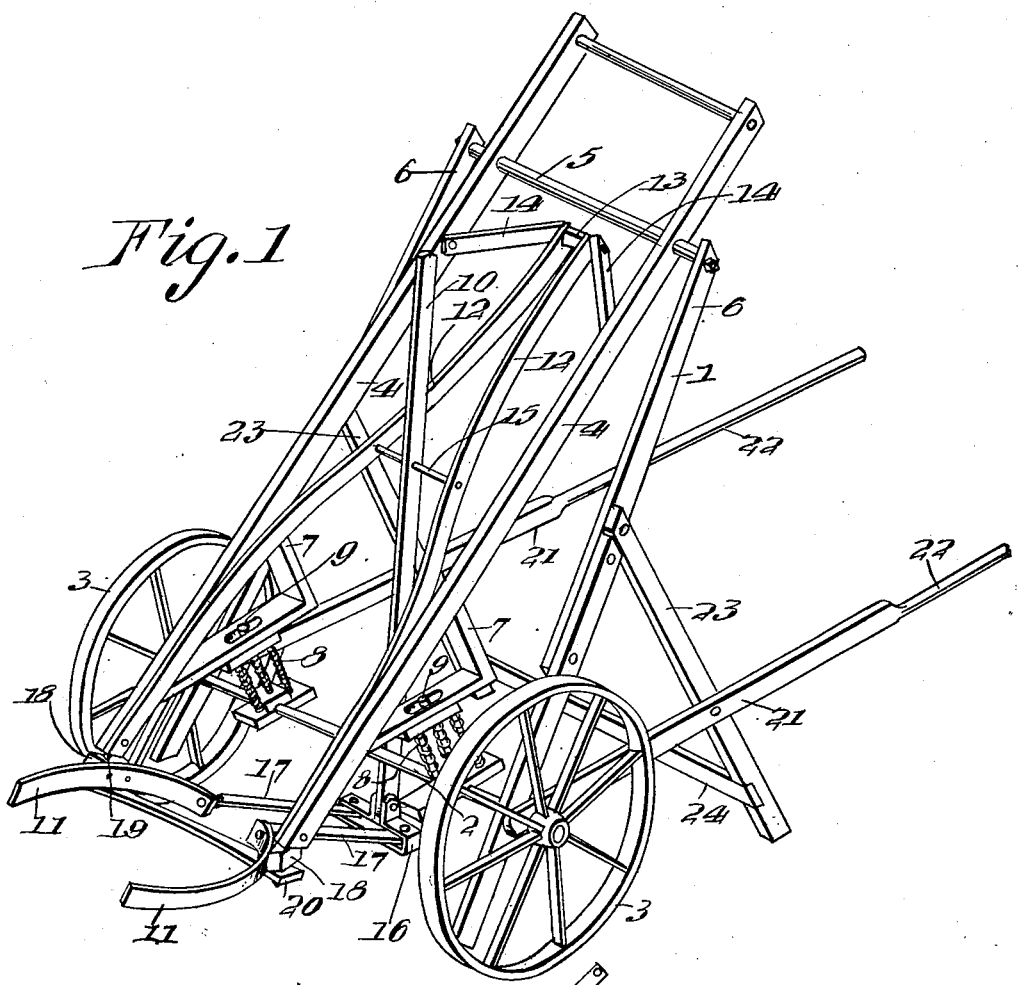
Figure 2:
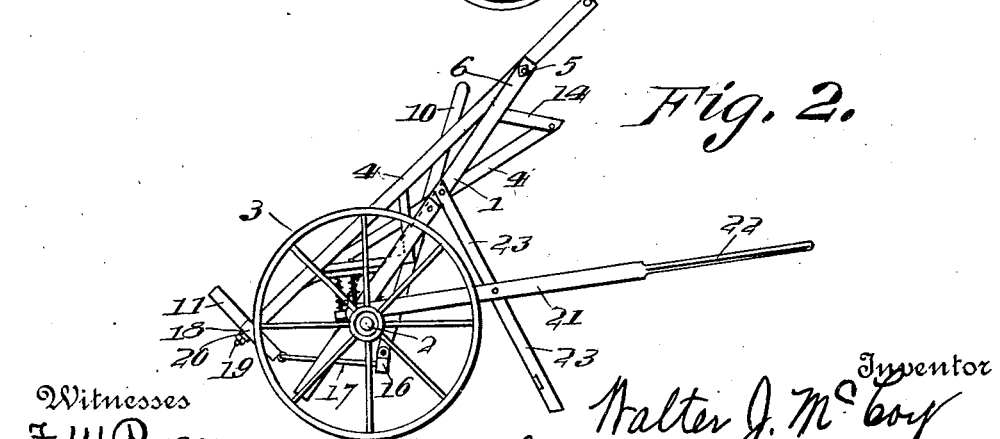

A structural embodiment of the invention is illustrated in the accompanying drawings, wherein:

Figure 1 is a perspective view of the improved truck, and Fig. 2 is a side elevation of said truck on a reduced scale.

The main parts of the truck, as shown in said drawing, are preferably of the same general construction as the corresponding parts in the construction shown in my prior application, above identified, to which reference may be had for detailed description.

It is sufficient for the present case to state that the truck includes the frame 1, axle 2, and wheels 3, the load-supporting arms 4 being pivoted at their upper ends to the cross-bar 5 that connects the corresponding ends of the inclined side beams 6. The supporting arms are each provided, as in the prior construction, with an L-shaped bracket 7 whose slotted longer arm rests upon the upper plate of the adjacent cushioning device 8, the main bolt 9 of said device projecting through the slot in said arm. Between the said supporting arms there is located a frame wherein is mounted the lever 10 for operating the clamping arms 11 hereinafter referred to. This frame consists of a pair of counterpart rods 12 which are so curved as to diverge at their lower ends and converge at their upper ends, the first-named ends being fastened to the lower ends of the supporting arms, while the second-named ends are joined together by a short connecting piece 13 and are supported by rearwardly extending converging braces 14 which are rigidly secured to said supporting arms. Midway between their ends, said rods 12 are connected by a horizontal pin 15 which passes through the central portion of lever 10 and constitutes a pivot or fulcrum for the same. At its lower or front end, said lever has secured thereto an open or skeleton strap bracket 16 wherein are pivoted the rear ends of two links 17. The front ends of these links are pivoted, in turn, to the rear ends of the arcuate clamping arms 11, which arms are fastened to centrally-located blocks 18 rotatable on pins 19 secured to the lower ends of the supporting arms. The projecting lower ends of the pins are connected by a supporting bar 20 which is curved or cut away to conform generally to the curvature of the barrel. The truck frame further includes, in common with the structure shown in my earlier application, a pair of horizontal beams 21 connected at their front ends to the axle 2 and terminating at their rear ends in handles 22, and a pair of vertical supports or legs 23 connected at their upper ends to beams 6 and intermediate their ends to beams 21. The lower ends of these legs are connected by a cross-beam 24. The cushioning devices, as in the prior construction, have their lower plates pivotally connected to the axle.

In operation, the truck is tilted so as to bring the load-supporting arms into vertical position, after which it is wheeled sufficiently close to the barrel to permit the latter to enter between the clamping arms 11 which are in open position at that time. The operating lever is then pushed forward, whereupon the said arms will be moved inwardly and tightened against the barrel.

I claim:

1. In a truck, the combination of a wheeled frame, a pair of load-supporting arms pivoted thereto for swinging movement, a pair of clamps pivoted to the lower ends of said arms, and means for operating said clamps.

2. In a truck, the combination of a wheeled frame including a pair of inclined beams and a cross-bar connecting the upper ends thereof, a pair of load-supporting arms pivoted at their upper ends to said bar, a pair of clamps pivoted to the lower ends of said arms, and means for operating said clamps.

3. In a truck, the combination of a wheeled frame, a pair of load-supporting arms pivoted thereto for swinging movement, a pair of clamps pivoted to said arms, means for operating said clamps, and a pair of cushioning devices against which said arms normally bear.

4. In a truck, the combination of a wheeled frame including a pair of inclined beams and a cross-bar connecting the upper ends thereof, a pair of load-supporting arms pivoted at their upper ends to said bar, a pair of clamps pivoted to the lower ends of said arms, means for operating said clamps, and a pair of cushioning devices against which said arms normally bear.

5. In a truck, the combination of a wheeled frame, a pair of spaced load-supporting arms pivoted thereto, a frame arranged between and connected to said arms, a pair of clamps pivoted to said arms, a lever pivotally mounted in the second-named frame, and connections between said lever and clamps for operating the latter from the former.

6. In a truck, the combination of a wheeled frame, a pair of load-supporting arms pivoted thereto, a block pivoted to the lower end of each arm, a clamp secured to each block, a lever, and connections between said lever and clamps for operating the latter from the former.

7. In a truck, the combination of a wheeled frame, a pair of load-supporting arms pivoted thereto for swinging movement, a pair of cushioning devices upon which said arms normally bear, a block pivoted to the lower end of each arm, a clamp secured to each block, a lever, and connections between said lever and clamps for operating the latter from the former.

8. In a truck, the combination of a wheeled frame, a pair of load-supporting arms, pivoted thereto, a clamp pivoted to the lower end of each arm, a lever provided at one end with a bracket, and a pair of links pivoted at one end in said bracket and at the other end to said clamps for operating the latter when said lever is rocked.

9. In a truck, the combination of a wheeled frame, a pair of spaced load-supporting arms pivoted thereto, a frame arranged between and connected to said arms, a pair of clamps pivoted to said arms, a lever pivotally mounted in the second-named frame, and provided at one end with a bracket, and a pair of links pivoted at one end in said bracket, and at the other end to said clamps, for operating the latter when said lever is rocked.

10. In a truck, the combination of a wheeled frame, a pair of spaced load-supporting arms pivoted thereto, a clamp pivoted to the lower end of each arm, a pair of spaced rods disposed between said arms and connected with the same at opposite ends, a pin connecting said arms intermediate their ends, a lever fulcrumed centrally upon said pin, and connections between said lever and clamps, for operating the latter when said lever is rocked.

11. In a truck, the combination of a wheeled frame, a pair of spaced load-supporting arms pivoted thereto, a clamp pivoted to the lower end of each arm, a pair of spaced rods disposed between said arms and connected with the same at opposite ends, a pin connecting said arms intermediate their ends, a lever fulcrumed centrally upon said pin, and provided at its lower end with a bracket, and a pair of links pivoted at one end in said bracket and at the other end to said clamps for operating the latter when said lever is rocked.

In testimony whereof I have hereunto set my hand in presence of two subscribing witnesses.

WALTER J. McCOY.

Witnesses:
FRANK J. LICHWORSKY,
LEE W. PERKINS.

Copies of this patent may be obtained for five cents each, by addressing the "Commissioner of Patents, Washington, D. C."